(12) United States Patent
Jo et al.

(10) Patent No.: US 6,853,504 B2
(45) Date of Patent: Feb. 8, 2005

(54) CAMERA LENS SYSTEM FOR IMAGE PICKUP DEVICES

(75) Inventors: Yong-Joo Jo, Osan-si (KR); Tae-Jun Seo, Suwon-si (KR); Jong-Cheol Park, Suwon-si (KR); Jang-Ho Lim, Suwon-si (KR)

(73) Assignee: Samsung Electro Mechanics Co., Ltd., Kyunggi-do (KR)

( * ) Notice: Subject to any disclaimer, the term of this patent is extended or adjusted under 35 U.S.C. 154(b) by 0 days.

(21) Appl. No.: 10/665,758

(22) Filed: Sep. 19, 2003

(65) Prior Publication Data

US 2004/0218082 A1 Nov. 4, 2004

(30) Foreign Application Priority Data

Apr. 30, 2003 (KR) .............................. 10-2003-0027674

(51) Int. Cl.[7] .......................... G02B 9/04; G02B 18/18; H04N 5/225
(52) U.S. Cl. ...................... 359/793; 359/717; 348/340
(58) Field of Search ............................... 348/340, 342, 348/360; 359/717, 793, 794, 795

(56) References Cited

U.S. PATENT DOCUMENTS 6,650,485 B2 * 11/2003 Shinohara ................... 359/717
2004/0105173 A1 * 6/2004 Yamaguchi et al. ......... 359/793

FOREIGN PATENT DOCUMENTS

KR          2002-85681       11/2002

\* cited by examiner

*Primary Examiner*—David N. Spector
(74) *Attorney, Agent, or Firm*—Gottlieb, Rackman & Reisman, P.C.

(57) ABSTRACT

The present invention relates generally to a camera lens system for image pickup devices, which is mounted in a mobile phone or personal digital assistant, and more particularly to a camera lens system for image pickup devices, which has a minimized overall length thereof to implement a micro lens, and in which lenses are formed to have suitable aspheric coefficients to reduce an incident angle of light on the lenses and improve the resolving power of the camera lens system. The camera lens system includes a first group lens having a convex, aspheric surface facing an object, a second group lens on which a light beam is incident from the first group lens and which is formed in an aspheric shape, an iris disposed at a side of the first group lens close to the object, a filter disposed at a side of the second group lens close to an image of the object, and an image sensor for converting the image formed through the first and second group lenses into an electrical signal. The camera lens system satisfies the conditions in which a focal length f1 of the first group lens is within a range of $4.7 \leq f1 \leq 4.9$, a focal length f2 of the second group lens is within a range of $23 \leq f2 \leq 24$, an overall focal length f of the camera lens system is within a range of $3.8 \leq f \leq 4.0$, and the overall length of the camera lens system is equal to or less than 4.9 mm.

5 Claims, 5 Drawing Sheets

CAMERA LENS SYSTEM FOR IMAGE PICKUP DEVICES

BACKGROUND OF THE INVENTION

1. Field of the Invention

The present invention relates generally to a camera lens system for image pickup devices, which is mounted in a mobile phone or personal digital assistant, and more particularly to a camera lens system for image pickup devices, which has a minimized overall length thereof to implement a micro lens, and in which lenses are formed to have suitable aspheric coefficients to reduce an incident angle of light on the lenses and improve the resolving power of the camera lens system.

2. Description of the Related Art

Recently, with the development of wireless communication technologies, there are many cases where digital cameras are mounted in mobile phones or Personal Digital Assistants (PDAs).

Generally, digital cameras are image recording media capable of photographing a plurality of still images without using films. Such a digital camera uses an image pickup device, which is a kind of semiconductor device, such as a Charged Coupled Device (CCD) or Complementary Metal Oxide Semiconductor (CMOS). In the digital camera, an object image formed on the image pickup device through a lens is converted into an electrical signal by the image pickup device, and the electrical signal is stored as a digital signal in a mobile phone or PDA in which the digital camera is mounted.

Since the digital camera for image pickup devices must be mounted in small mobile phones or PDAs, technology of miniaturizing the digital camera is a key point. In the prior art, an externally mounted digital camera as well as an internally mounted digital camera is also used.

The externally mounted digital camera is mounted at a portion of a body of a mobile phone to photograph an object in front or back of a Liquid Crystal Display (LCD) window of the mobile phone while being manually rotated by a user.

However, such an externally mounted digital camera is problematic in that it is inconvenient to use because a user always carries both a mobile phone and the digital camera, and uses the digital camera by attaching it to the mobile phone if necessary, and the total volume of the devices increases.

Therefore, a mobile phone with an internally mounted camera is generally used. In this case, the camera is installed at a hinge of the mobile phone that connects a cover part to a body.

As described above, the internally mounted camera must be mounted in a limited space, so the minimizing the size and weight of the camera is required.

FIG. 1 illustrates a conventional camera lens system for CCDs. The camera lens system for CCDs comprises a meniscus-shaped first lens 11 having a negative refractive index, a second lens 13 having a positive refractive index, a third lens 16 having a positive refractive index, a fourth lens 18 having a negative refractive index, and a CCD 12 for converting a light beam into an electrical signal.

An iris 14 is disposed between the first and second lenses 11 and 13 to adjust the quantity of light, and an optical filter 19 is used to block light rays, except for a required visible ray.

However, since the above lens system for image pickup devices requires at least four lenses to correct aberrations (especially, distortion aberrations), the number of lenses is increased and, therefore, the overall length of the lens system is increased. Thus, it is difficult to miniaturize the lens system.

Therefore, in order to solve this problem, a miniaturized lens system in which the number of lenses is decreased and, therefore, the overall length of the lens system is decreased is disclosed in Korean Patent Application No. 2001-25317. Referring to FIG. 2, the lens system comprises a meniscus-shaped first lens unit 21 having a convex incident surface facing an object, a meniscus-shaped second lens unit 23 on which a light beam is incident from the first lens unit 21 and which has a concave incident surface facing the object, an iris 22 disposed between the first and second lens units 21 and 23 to adjust the quantity of light, and an optical filter 24 disposed between the second lens unit 23 and an image-formation surface formed by the first and second lens units 21 and 23.

The first lens unit 21 is comprised of meniscus-shaped lens surfaces S1 and S2 (radius of curvature) which are convex toward the object, and the iris 22 is positioned between the first and second lens units 21 and 23 to adjust the quantity of light. The second lens unit 23 is comprised of lens surfaces S3 and S4 (radius of curvature) which are concave toward the object. The optical filter 24 is disposed at the back of the second lens unit 23 to block light rays except for a required light ray. Further, in the lens system, an image sensor 25 is provided to convert a light beam passing through the optical filter 24 into an electrical signal.

Such a conventional lens system is characterized in that the iris 22 is disposed between the first and second lens units 21 and 23 to precisely correct distortion aberrations by a symmetrical structure of the lens units 21 and 23 formed around the iris 22 and reduce the overall length of the lens system for image pickup devices, thus miniaturizing the lens system.

The first and second lens units 21 and 23 are formed in an aspheric shape, wherein the shapes of aspheric surfaces forming the first and second lens units 21 and 23 are expressed by the following Equation, assuming that a Z axis is taken as an optic axis, an X axis is taken as an axis perpendicular to the optic axis, light is directed forward, and K, A, B, C, D and E are aspheric coefficients, $$Z = \frac{\frac{h^2}{r}}{1 + \sqrt{1 - (1+K) \times \frac{h^2}{r^2}}} + A \times h^4 + B \times h^6 + C \times h^8 + D \times h^{10} + E \times h^{12} \qquad [1]$$

where r is the radius of curvature and h is an X axis length.

However, even though the conventional lens system uses aspheric surfaces, an incident angle of a light beam on an edge portion art of an image-formation surface of the image sensor 25 is excessively large, thus deteriorating the resolving power of the edge portion of the image-formation surface and causing distortion.

That is, in the conventional lens system, a light beam incident on a center portion of the image-formation surface of the image sensor 25 has a small incident angle according to the normal progress of the light beam, while a light beam incident on the edge portion thereof has a large incident angle to deteriorate the resolving power of the edge portion and cause distortion.

Generally, the image sensor 25 senses light from pixels formed on the image-formation surface, and the sensitivities of the pixels in the image sensor 25 are uniform, so the quantity of light incident on the image sensor 25 must be uniform at any position on the image sensor 25. However, the conventional lens system is problematic in that a difference between the incident angles of light beams on the center portion and the edge portion, respectively, is great, so there is a difference between quantities of light incident on the image sensor 25, thus causing the edge portion to be relatively dark and causing distortion.

Further, the conventional lens system is problematic in that its overall optical length is large to such an extent that it is equal to or greater than 5.3 mm, so it is difficult to miniaturize a mobile phone or PDA to which the lens system will be mounted.

SUMMARY OF THE INVENTION

Accordingly, the present invention has been made keeping in mind the above problems occurring in the prior art, and an object of the present invention is to provide a camera lens system for image pickup devices, in which aspheric surfaces of lenses are formed using suitable aspheric coefficients, thus improving the resolving power of the lens system and additionally removing distortion.

Another object of the present invention is to provide a camera lens system for image pickup devices, in which an incident angle of light on an edge portion of the camera lens system is reduced to 20° or less to uniformly maintain the quantity of light incident on center and edge portions of an image sensor and obtains the largest possible amount of light on the edge portion, thus preventing the edge portion from being relatively dark and distortion from occurring.

A further object of the present invention is to provide a camera lens system for image pickup devices, in which an overall optical length of the camera lens system is minimized to be 4.9 mm or less, thus realizing the miniaturization and light weight of the camera lens system.

In order to accomplish the above object, the present invention provides a camera lens system for image pickup devices, comprising a first group lens having a convex, aspheric surface facing an object, a second group lens on which a light beam is incident from the first group lens and which is formed in an aspheric shape, an iris disposed at a side of the first group lens close to the object, a filter disposed at a side of the second group lens close to an image of the object, and an image sensor for converting the image formed through the first and second group lenses into an electrical signal, wherein the camera lens system satisfies the following conditions, $$4.7 \leq f1 \leq 4.9 \quad (1)$$

$$23 \leq f2 \leq 24 \quad (2)$$

$$3.8 \leq f \leq 4.0 \quad (3)$$

where f1 is a focal length (mm) of the first group lens, f2 is a focal length (mm) of the second group lens, and f is an overall focal length (mm) of the camera lens system.

Preferably, the camera lens system satisfies the following condition, $$4.8 \leq L \leq 4.9 \quad (4)$$

where L is an overall length (mm) of the camera lens system.

Preferably, the first and second group lenses are designed so that radiuses of curvatures thereof satisfy the following conditions, $$1.33 \leq r1 \leq 1.35 \quad (5)$$

$$1.9 \leq r2 \leq 2.1 \quad (6)$$

$$2.64 \leq r3 \leq 2.66 \quad (7)$$

$$2.87 \leq r4 \leq 2.89 \quad (8)$$

where r1 is a radius of curvature (mm) of a surface of the first group lens facing the object, r2 is a radius of curvature (mm) of a surface of the first group lens facing the image, r3 is a radius of curvature (mm) of a surface of the second group lens facing the object, and r4 is a radius of curvature (mm) of a surface of the second group lens facing the image.

Preferably, wherein the camera lens system satisfies the following conditions, $$0.05 \leq S1 \leq 0.15 \quad (9)$$

$$0.94 \leq S2 \leq 0.96 \quad (10)$$

$$1.2 \leq S3 \leq 1.4 \quad (11)$$

$$1.0 \leq S4 \leq 1.2 \quad (12)$$

$$0.3 \leq S5 \leq 0.5 \quad (13)$$

$$0.5 \leq S6 \leq 0.6 \quad (14)$$

$$0.4 \leq S7 \leq 0.5 \quad (15)$$

where S1 is a distance (mm) between the iris and the surface of the first group lens facing the object, S2 is a central thickness (mm) of the first group lens, S3 is a distance (mm) between the first and second group lenses, S4 is a central thickness (mm) of the second group lens, S5 is a distance (mm) between the surface of the second group lens facing the image and the filter, S6 is a thickness (mm) of the filter, and S7 is a distance between the filter and the image sensor.

Preferably, the camera lens system is designed so that, if K, A, B, C, D and E are aspheric coefficients, shapes of aspheric surfaces of the first and second group lenses, expressed by equation $$Z = \frac{\frac{h^2}{r}}{1 + \sqrt{1 - (1+K) \times \frac{h^2}{r^2}}} + A \times h^4 + B \times h^6 + C \times h^8 + D \times h^{10} + E \times h^{12},$$

satisfy conditions indicted in the following Table,

| No | K | A | B | C | D | E |
|---|---|---|---|---|---|---|
| 2 | −3.46 | 0.17735E+00 | 0.39590E−02 | −0.1610E+00 | 0.3114E+00 | −0.1833E+00 |
| 3 | 1.5045E+00 | 1.3898E−01 | −1.6119E−01 | 4.0606E−01 | −2.241E−01 | |
| 4 | −293.436995 | 0.15454E+00 | −0.2778E+00 | 0.20857E+00 | −0.78496E−01 | 0.11370E−01 |
| 5 | −389.03712 | 0.72780E−01 | −0.92636E−01 | 0.40519E−01 | −0.87947E−02 | 0.69212E−03 | where No. 2 is the surface of the first group lens facing the object, No. 3 is the surface thereof facing the image, No. 4 is the surface of the second group lens facing the object, and 5 is the surface thereof facing the image.

BRIEF DESCRIPTION OF THE DRAWINGS

The above and other objects, features and other advantages of the present invention will be more clearly understood from the following detailed description taken in conjunction with the accompanying drawings, in which:

FIGS. 4a and 4b are views comparing an image photographed by a typical camera lens system with an image photographed by the camera lens system of the present invention, wherein FIG. 4a illustrates the image obtained using the typical camera lens system and FIG. 4b illustrates the image obtained using the camera lens system of the present invention.

DESCRIPTION OF THE PREFERRED EMBODIMENTS

Hereinafter, embodiments of the present invention will be described in detail with reference to the attached drawings.

Figure 3:
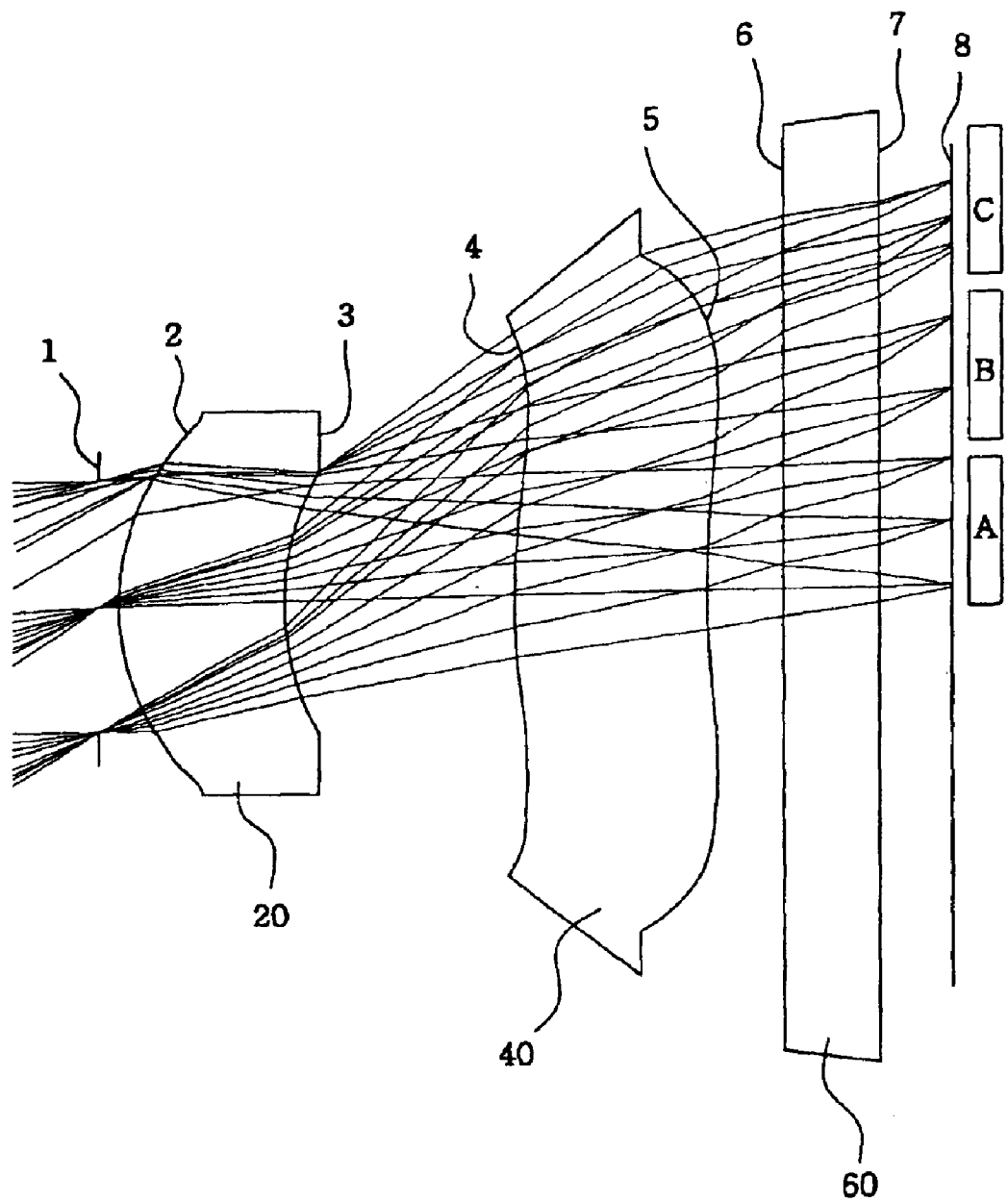
FIG. 3 is a view showing the construction of a camera lens system for image pickup devices according to the present invention.

FIG. 3 is a view showing the construction of a camera lens system for image pickup devices according to an embodiment of the present invention. As shown in FIG. 3, the camera lens system of the present invention comprises a first group lens 20 having a convex, aspheric surface facing an object, a second group lens 40 on which a light beam is incident from the first group lens 20 and which is formed in an aspheric shape, an iris 1 disposed at a side of the first group lens 20 close to the object, a filter 60 disposed at a side of the second group lens 40 close to an image of the object, and an image sensor 8 for converting the image formed through the first and second group lenses 20 and 40 into an electrical signal.

In this case, the first and second group lenses 20 and 40 are arranged in order and lenses made of plastic are used as the first and second group lenses 20 and 40.

A ¼ inch CMOS sensor generally used in mobile phones is used as the image sensor 8. The present invention is used to design a lens system suitable for the specification of a device equipped with the ¼ inch CMOS sensor.

In this embodiment of the present invention, the iris 1 is disposed at the side close to the object differently from the conventional lens system. Therefore, the iris 1 will be designated as a first surface, and surfaces of the first and second group lenses 20 and 40 will be designated as second to fifth surfaces in order from the object side.

Figure 1:
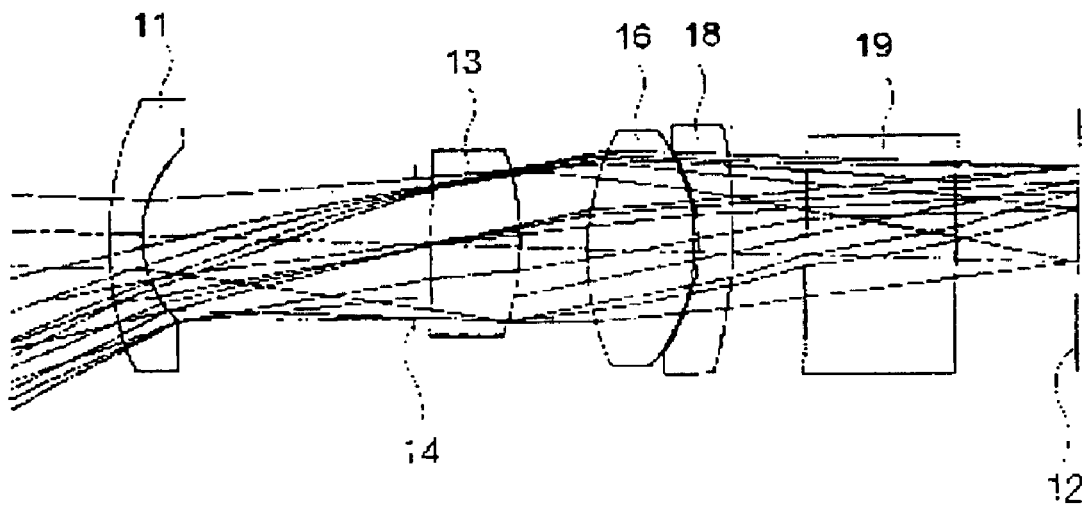
FIG. 1 is a view showing the construction of a conventional camera lens system for CCDs.
Figure 2:
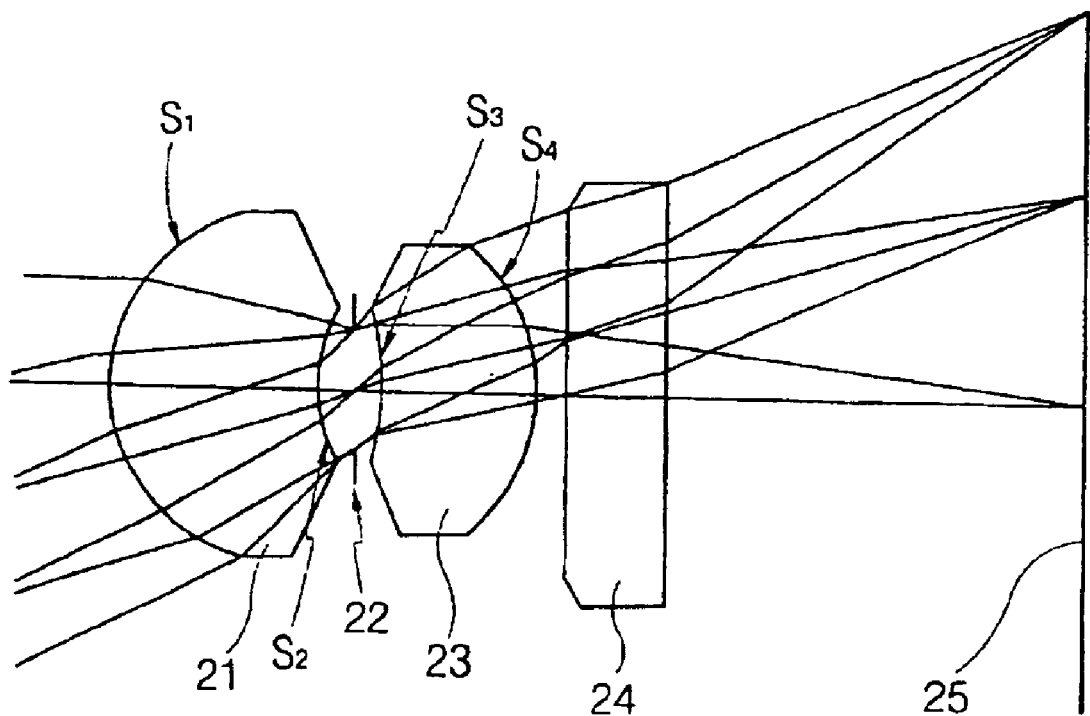
FIG. 2 is a view showing the construction of another conventional camera lens system for image pickup devices.

That is, as shown in FIG. 2, the surface of the first group lens 20 facing the object is called the second surface 2, the surface thereof facing the image is called the third surface 3, the surface of the second group lens 40 facing the object is called the forth surface 4, the surface thereof facing the image is called the fifth surface 5, a surface of the filter facing the object is called a sixth surface 6, and a surface thereof facing the image is called a seventh surface 7.

The camera lens system according to the present invention is designed so that an overall optical length thereof is equal to or less than 4.9 mm and an allowable incident angle thereof is equal to or less than 20° C. so as to minimize the overall optical length and prevent an edge portion of the image sensor 8 from being relatively dark by reducing an incident angle of light on the edge portion of the image sensor 8, for the purpose of realizing miniaturization and light weight of the camera lens system.

For this operation, the aspheric surfaces of the lenses are formed using suitable aspheric coefficients, thus the performance of the lens system having the specification of a device equipped with the ¼ inch CMOS sensor is improved, and the overall length of the lens system is designed to be equal to or less than 4.9 mm, thus minimizing the size of the lens system and maintaining the performance thereof.

In order to satisfy such detailed optical items, the lenses must satisfy the following conditions in the embodiment of the present invention, $$4.7 \leq f1 \leq 4.9 \tag{1}$$

$$23 \leq f2 \leq 24 \tag{2}$$

$$3.8 \leq f \leq 4.0 \tag{3}$$

where f1 is a focal length (mm) of the first group lens 20, f2 is a focal length (mm) of the second group lens 40, and f is an overall focal length (mm) of the lens system in which the first and second group lenses 20 and 40 are included.

Preferably, the focal length f1 of the first group lens 20 is 4.8 mm, the focal length f2 of the second group lens 40 is 23.3 mm, and the overall focal length f of the lens system is 3.9 mm.

That is, the lenses of the lens system of the present invention are arranged as indicated in Table 1.

TABLE 1

|  | Focal length (mm) |
| --- | --- |
| First group lens (second and third surfaces) | 4.8 |
| Second group lens (fourth and fifth surfaces) | 23.3 |
| Lens system | 3.9 |

The focal lengths of the lenses according to the embodiment of the present invention are values for satisfying the conditions in which the overall length of the lens system is equal to or less than 4.9 mm and the allowable incident angle of the lens system is equal to or less than 20° in the case of the lens system provided with the ¼ inch CMOS sensor.

Further, preferably, the lens system according to the present invention is designed to satisfy the following condition, $$4.8 \leq L \leq 4.9 \quad (4)$$

where L is the overall length (mm) of the lens system.

Further, the radiuses of curvatures of the first and second group lenses 20 and 40 are designed to satisfy the following conditions, $$1.33 \leq r1 \leq 1.35 \quad (5)$$

$$1.9 \leq r2 \leq 2.1 \quad (6)$$

$$2.64 \leq r3 \leq 2.66 \quad (7)$$

$$2.87 \leq r4 \leq 2.89 \quad (8)$$

where r1 is the radius of curvature (mm) of the second surface 2 of the first group lens 20 facing the object, r2 is the radius of curvature (mm) of the third surface 3 of the first group lens 20 facing the image, r3 is the radius of curvature (mm) of the fourth surface 4 of the second group lens 40 facing the object, and r4 is the radius of curvature (mm) of the fifth surface 5 of the second group lens 40 facing the image.

In this case, r1, r2, r3 and r4 are preferably 1.34 mm, 2.0 mm, 2.65 mm, and 2.88 mm, respectively.

Further, distances between respective components, and thicknesses of the lenses in the embodiment of the present invention satisfy the following conditions, $$0.05 \leq S1 \leq 0.15 \quad (9)$$

$$0.94 \leq S2 \leq 0.96 \quad (10)$$

$$1.2 \leq S3 \leq 1.4 \quad (11)$$

$$1.0 \leq S4 \leq 1.2 \quad (12)$$

$$0.3 \leq S5 \leq 0.5 \quad (13)$$

$$0.5 \leq S6 \leq 0.6 \quad (14)$$

$$0.4 \leq S7 \leq 0.5 \quad (15)$$

where S1 is a distance (mm) between the iris 1 and the second surface 2 of the first group lens 20 facing the object, S2 is a central thickness (mm) of the first group lens 20, S3 is a distance (mm) between the first and second group lenses 20 and 40, S4 is a central thickness (mm) of the second group lens 40, S5 is a distance (mm) between the fifth surface 5 of the second group lens 40 facing the image and the filter 60, S6 is a thickness (mm) of the filter 60, and S7 is a distance (mm) between the filter 60 and the image sensor 8.

Further, the refractive indexes of the first group lens 20, the second group lens 40 and the filter 60 are 1.53, 0.53 and 0.517, respectively.

That is, detailed data of the lens system according to the embodiment of the present invention are indicated in Table 2.

TABLE 2

| No | Radius of curvature | Thickness | Refractive index |
| --- | --- | --- | --- |
| 1 |  | 0.1 |  |
| 2 | 1.34 | 0.95 | 1.53 |
| 3 | 2.0 | 1.3 |  |
| 4 | 2.65 | 1.1 | 0.53 |
| 5 | 2.88 | 0.4 |  |
| 6 | Infinite | 0.55 | 0.517 |
| 7 | Infinite | 0.43 |  |
| 8 |  |  |  |

Assuming that a Z axis is taken as an optic axis, an X axis is taken as an axis perpendicular to the optic axis, light is directed forward, and K, A, B, C, D and E are aspheric coefficients, the aspheric surface shapes of the lenses of the lens system of the present invention are expressed by the following Equation, $$Z = \frac{\frac{h^2}{r}}{1 + \sqrt{1 - (1+K) \times \frac{h^2}{r^2}}} + \quad [2]$$

$$A \times h^4 + B \times h^6 + C \times h^8 + D \times h^{10} + E \times h^{12}$$

Aspheric data in the embodiment of the present invention indicated in Table 3.

TABLE 3

| No | K | A | B | C | D | E |
| --- | --- | --- | --- | --- | --- | --- |
| 2 | −3.46 | 0.17735E+00 | 0.39590E−02 | −0.1610E+00 | 0.3114E+00 | −0.1833E+00 |
| 3 | 1.5045E+00 | 1.3898E−01 | −1.6119E−01 | 4.0606E−01 | −2.241E−01 |  |
| 4 | −293.436995 | 0.15454E+00 | −0.2778E+00 | 0.20857E+00 | −0.78496E−01 | 0.11370E−01 |
| 5 | −389.03712 | 0.72780E−01 | −0.92636E−01 | 0.40519E−01 | −0.87947E−02 | 0.69212E−03 |

In the present invention, the aspheric surface shapes of the lenses are formed by controlling aspheric coefficients of higher-order terms.

In the lens system of the present invention having aspheric surfaces formed under the above conditions, the focal length of the first group lens 20 is 4.8 mm, so the condition (1) is satisfied.

Further, the focal length of the second group lens 40 is 23.3 mm, so the condition (2) is satisfied.

Further, the overall focal length of the lens system is 3.9 mm, so the condition (3) is satisfied, thus achieving the object of the present invention.

Further, the overall length of the lens system to which the above aspheric coefficients are applied is 4.86 mm.

Therefore, the condition (4) is satisfied, thus the overall length of a conventional lens system greater than 5.3 mm can be reduced, thus enabling a small lens system to be provided.

Further, in the lens system of the present invention having aspheric surfaces formed under the above conditions, the radiuses of curvatures of respective surfaces of the first and second group lenses 20 and 40 are obtained as r1 is 1.34 mm, r2 is 2.0 mm, r3 is 2.65 mm, and r4 is 2.88 mm, respectively. Therefore, the conditions (5) to (8) can be satisfied.

Further, the distance between the iris 1 and the second surface 2 of the first group lens 20 facing the object is 0.1 mm, the central thickness of the first group lens 20 is 0.95 mm, the distance between the first and second group lenses 20 and 40 is 1.33 mm, the central thickness of the second group lens 40 is 1.1 mm, the distance between the fifth surface 5 of the second group lens 40 facing the image and the filter 60 is 0.4 mm, the thickness of the filter 60 is 0.55 mm, and the distance between the filter 60 and the image sensor 8 is 0.43 mm.

Therefore, the above conditions (6) to (15) can be satisfied.

Angle data improved through the aspheric data of the present invention are indicated in Table 4.

TABLE 4

|  | Incident angle |
| --- | --- |
| A zone | 11° |
| B zone | 20° |
| C zone | 17.5° |

That is, an incident angle of light on C zone, the edge portion of the image-formation surface of the image sensor 8, is 17.5°, so the incident angle equal to or less than 20° can be obtained.

Therefore, there can be solved a problem in that an edge portion of the image is relatively dark in the conventional lens system due to a large incident angle of light on the edge portion of the image sensor 8.

That is, the quantity of light incident on the image sensor 8 is uniformly maintained at any position thereof, so the amount of light of the edge portion of the image sensor 8 is sufficiently obtained. Consequently, the quantity of light is uniformly maintained over the center and edge portions of the image-formation surface of the image sensor 8.

Further, resolving power data are shown in Table 5.

TABLE 5

|  | MTF (T + S) 60 line/min |
| --- | --- |
| 0.0f | 0.55 |
| 0.15f | 0.54 |
| 0.31f | 0.45 |
| 0.46f | 0.4 |
| 0.63f | 0.35 |

TABLE 5-continued

|  | MTF (T + S) 60 line/min |
| --- | --- |
| 0.81f | 0.3 |
| 1.0f | 0.43 |

In Table 5, 0.0f, 0.15f, 0.31f, 0.46f, 0.63f, 0.81f and 1.0f designate intervals of the image-formation surface of the image sensor 8 on which the image is formed. If the position of a center is 0.0f, the end of the C zone is 1.0f.

In the above embodiment of the present invention, the resolving power MTF (T+S) can be uniform.

Further, distortion data are indicated in Table 6.

TABLE 6

|  | Distortion (%) |
| --- | --- |
| 0.0f | 0.0 |
| 0.2f | 1.0 |
| 0.4f | 1.68 |
| 0.6f | 1.95 |
| 0.8f | 1.99 |
| 1.0f | 0.0 |

As indicated in Table 6, when the image-formation surface of the image sensor 8 is equally divided at regular intervals of 0.2f, percentage distortion at the center (0.0f) and the end (1.0f) is 0%. Therefore, it can be shown that distortion, which was generated at the C zone of the conventional lens system, is greatly reduced.

Figure 4A:
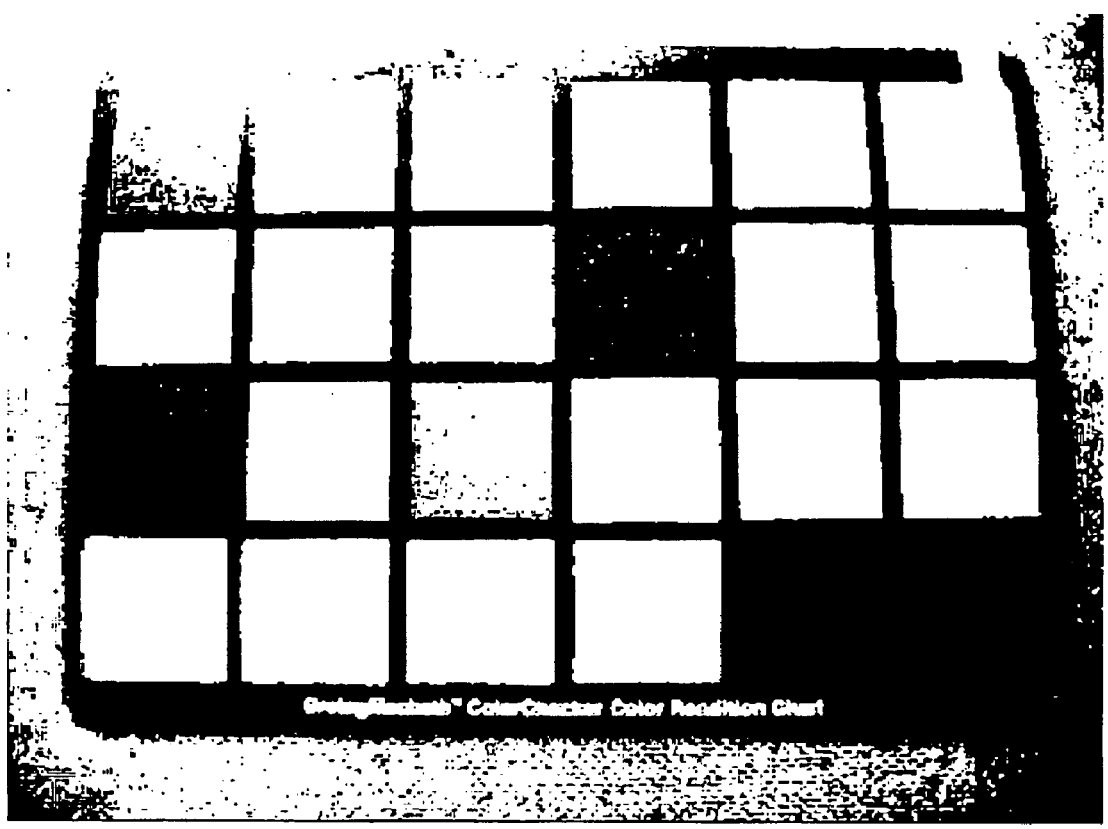
Figure 4B:
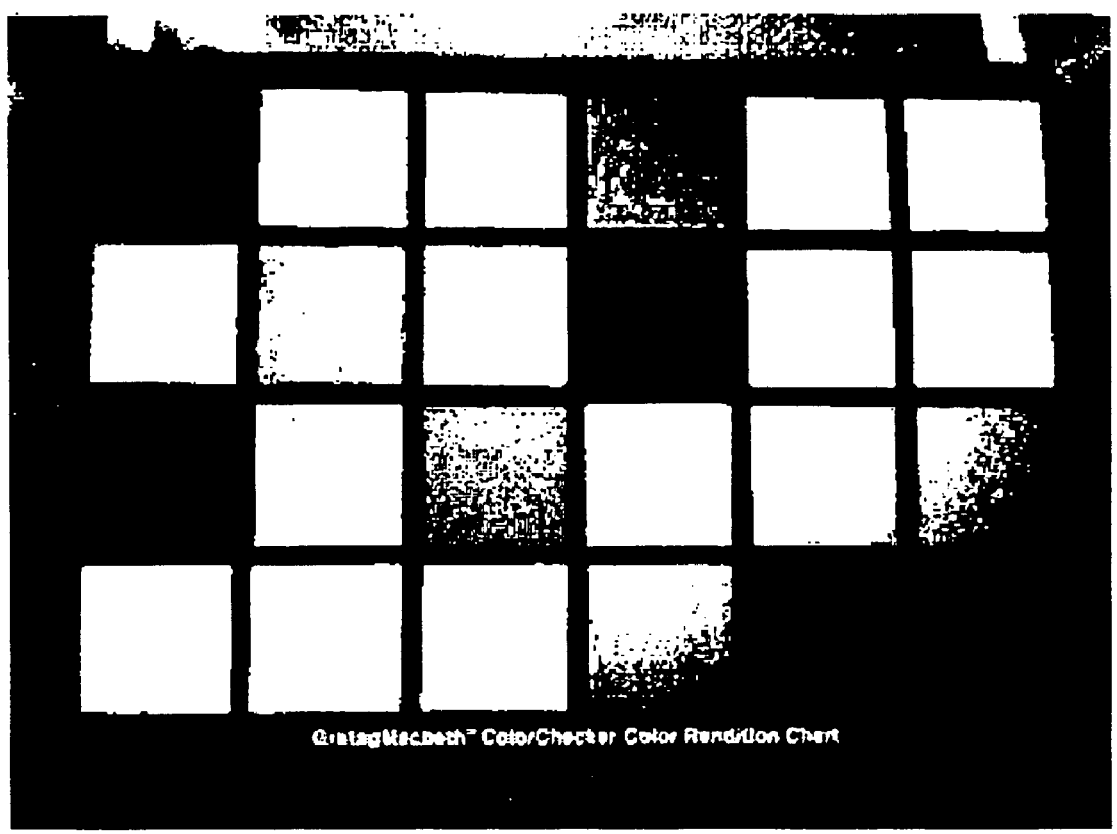

FIGS. 4a and 4b are views comparing an image photographed by a typical camera lens system with an image photographed by the camera lens system of the present invention, wherein FIG. 4a illustrates the image obtained using the typical camera lens system and FIG. 4b illustrates the image obtained using the camera lens system of the present invention.

As shown in FIG. 4a, the resolving power is deteriorated in the conventional lens system and, especially, distortion of the edge portion is excessively generated. However, in the lens system of the present invention in FIG. 4b, resolving power is improved and the distortion of the edge portion is greatly reduced, thus remarkably improving the performance of the lens system.

The above-described present invention controls higher-order terms of the equation for aspheric surfaces to reduce an incident angle of a light beam on the image-formation surface of the image sensor, thus improving resolving power and simultaneously removing distortion.

As described above, the present invention provides a camera lens system for image pickup devices, in which aspheric surfaces of lenses are formed using suitable aspheric coefficients, thus allowing an incident angle of light on an image sensor to be equal to or less than 20°, improving resolving power and simultaneously removing distortion.

Further, the present invention is advantageous in that an incident angle of light on an edge portion of the camera lens system is reduced to 20° or less to uniformly maintain the quantity of light incident on center and edge portions of an image sensor and obtains the largest possible amount of light on the edge portion, thus preventing the edge portion from being relatively dark.

Further, the present invention is advantageous in that an overall optical length of the camera lens system is minimized to be 4.9 mm or less, thus realizing the miniaturization and light weight of a mobile phone or PDA in which the camera lens system is mounted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A camera lens system for image pickup devices, comprising:

a first group lens having a convex, aspheric surface facing an object;

a second group lens on which a light beam is incident from the first group lens and which is formed in an aspheric shape;

an iris disposed at a side of the first group lens close to the object;

a filter disposed at a side of the second group lens close to an image of the object; and an image sensor for converting the image formed through the first and second group lenses into an electrical signal, wherein the camera lens system satisfies the following conditions, $$4.7 \leq f1 \leq 4.9 \tag{1}$$

$$23 \leq f2 \leq 24 \tag{2}$$

$$3.8 \leq f \leq 4.0 \tag{3}$$

where f1 is a focal length (mm) of the first group lens, f2 is a focal length (mm) of the second group lens, and f is an overall focal length (mm) of the camera lens system.

2. The camera lens system for image pickup devices according to claim 1, wherein the camera lens system satisfies the following condition, $$4.8 \leq L \leq 4.9 \tag{4}$$

where L is an overall length (mm) of the camera lens system.

3. The camera lens system for image pickup devices according to claim 1 or 2, wherein the first and second group lenses are designed so that radiuses of curvatures thereof satisfy the following conditions, $$1.33 \leq r1 \leq 1.35 \tag{5}$$

$$1.9 \leq r2 \leq 2.1 \tag{6}$$

$$2.64 \leq r3 \leq 2.66 \tag{7}$$

$$2.87 \leq r4 \leq 2.89 \tag{8}$$

where r1 is a radius of curvature (mm) of a surface of the first group lens facing the object, r2 is a radius of curvature (mm) of a surface of the first group lens facing the image, r3 is a radius of curvature (mm) of a surface of the second group lens facing the object, and r4 is a radius of curvature (mm) of a surface of the second group lens facing the image.

4. The camera lens system for image pickup devices according to claim 3, wherein the camera lens system satisfies the following conditions, $$0.05 \leq S1 \leq 0.15 \tag{9}$$

$$0.94 \leq S2 \leq 0.96 \tag{10}$$

$$1.2 \leq S3 \leq 1.4 \tag{11}$$

$$1.0 \leq S4 \leq 1.2 \tag{12}$$

$$0.3 \leq S5 \leq 0.5 \tag{13}$$

$$0.5 \leq S6 \leq 0.6 \tag{14}$$

$$0.4 \leq S7 \leq 0.5 \tag{15}$$

where S1 is a distance (mm) between the iris and the surface of the first group lens facing the object, S2 is a central thickness (mm) of the first group lens, S3 is a distance (mm) between the first and second group lenses, S4 is a central thickness (mm) of the second group lens, S5 is a distance (mm) between the surface of the second group lens facing the image and the filter, S6 is a thickness (mm) of the filter, and S7 is a distance between the filter and the image sensor.

5. The camera lens system for image pickup devices according to claim 4, wherein the camera lens system is designed so that, if K, A, B, C, D and E are aspheric coefficients, shapes of aspheric surfaces of the first and second group lenses, expressed by equation $$Z = \frac{\frac{h^2}{r}}{1 + \sqrt{1 - (1+K) \times \frac{h^2}{r^2}}} + A \times h^4 + B \times h^6 + C \times h^8 + D \times h^{10} + E \times h^{12},$$

satisfy conditions indicted in the following Table,

| No | K | A | B | C | D | E |
|---|---|---|---|---|---|---|
| 2 | −3.46 | 0.17735E+00 | 0.39590E−02 | −0.1610E+00 | 0.3114E+00 | −0.1833E+00 |
| 3 | 1.5045E+00 | 1.3898E−01 | −1.6119E−01 | 4.0606E−01 | −2.241E−01 | |
| 4 | −293.436995 | 0.15454E+00 | −0.2778E+00 | 0.20857E+00 | −0.78496E−01 | 0.11370E−01 |
| 5 | −389.03712 | 0.72780E−01 | −0.92636E−01 | 0.40519E−01 | −0.87947E−02 | 0.69212E−03 | where No. 2 is the surface of the first group lens facing the object, No. 3 is the surface thereof facing the image, No. 4 is the surface of the second group lens facing the object, and 5 is the surface thereof facing the image.

* * * * *